United States Patent
Yamada

(10) Patent No.: US 11,079,010 B2
(45) Date of Patent: Aug. 3, 2021

(54) SHIFT RANGE CONTROL DEVICE

(71) Applicant: DENSO CORPORATION, Kariya (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/801,598

(22) Filed: Feb. 26, 2020

(65) Prior Publication Data

US 2020/0191261 A1 Jun. 18, 2020

Related U.S. Application Data

(63) Continuation of application No. PCT/JP2018/032528, filed on Sep. 3, 2018.

(30) Foreign Application Priority Data

Sep. 5, 2017 (JP) .............................. JP2017-170342

(51) Int. Cl.
*F16H 59/68* (2006.01)
*F16H 59/10* (2006.01)
(Continued)

(52) U.S. Cl.
CPC ........... *F16H 59/105* (2013.01); *F16H 59/68* (2013.01); *F16H 2061/326* (2013.01); *F16H 2063/423* (2013.01)

(58) Field of Classification Search
CPC .. F16H 59/105; F16H 59/68; F16H 2061/326; F16H 2063/423
See application file for complete search history.

(56) References Cited

U.S. PATENT DOCUMENTS 7,717,006 B2 * 5/2010 Kimura .................. F16H 61/32
74/335
8,311,716 B2 * 11/2012 Hoshino ................. F16H 61/12
701/62
(Continued)

FOREIGN PATENT DOCUMENTS

JP 2016-75364 5/2016
JP 2018-200079 12/2018
(Continued)

OTHER PUBLICATIONS

U.S. Appl. No. 16/807,568, inventor: Kamio, entitled "Shift Range Control Device", filed Mar. 3, 2020, N&V Docket No. 2018-4194 (23 pages).

(Continued)

*Primary Examiner* — David M Fenstermacher
(74) *Attorney, Agent, or Firm* — Nixon & Vanderhye P.C.

(57) ABSTRACT

An angle calculation unit acquires a motor rotation angle signal, output from a motor rotation angle sensor detecting a rotational position of a motor, and calculates a motor angle. A signal acquisition unit acquires an output shaft signal that is output from an output shaft sensor and has a value changing stepwise in accordance with a rotational position of an output shaft, the output shaft sensor detecting a rotational position of an output shaft to which the rotation of the motor 10 is transmitted. A drive control unit controls the drive of the motor such that the motor angle becomes a target motor angle value corresponding to a target shift range. A range determination unit determines an actual range based on the output shaft signal and the motor rotation angle signal.

5 Claims, 10 Drawing Sheets

(51) Int. Cl.
  *F16H 61/32* (2006.01)
  *F16H 63/42* (2006.01)

(56) References Cited

U.S. PATENT DOCUMENTS

| | | | | |
|---|---|---|---|---|
| 9,970,539 | B2* | 5/2018 | Sakaguchi | F16H 61/32 |
| 10,234,030 | B2* | 3/2019 | Nakayama | H02K 1/146 |
| 10,288,171 | B2* | 5/2019 | Yamamoto | G05D 3/20 |
| 10,615,724 | B2* | 4/2020 | Kamio | F16H 61/28 |
| 10,644,622 | B2* | 5/2020 | Kamio | F16H 61/28 |
| 10,680,542 | B2* | 6/2020 | Kamio | H02P 29/64 |
| 10,844,952 | B2* | 11/2020 | Sakaguchi | B60W 30/19 |
| 10,931,214 | B2* | 2/2021 | Silitonga | H02P 7/2913 |
| 10,941,860 | B2* | 3/2021 | Kamio | F16H 61/30 |
| 10,948,073 | B2* | 3/2021 | Kamio | F16H 59/105 |
| 10,948,078 | B2* | 3/2021 | Kamio | F16H 61/02 |
| 2005/0174084 | A1 | 8/2005 | Nakai et al. | |
| 2015/0222211 | A1 | 8/2015 | Maruo et al. | |
| 2016/0102761 | A1 | 4/2016 | Kuwahara et al. | |

FOREIGN PATENT DOCUMENTS

| | | |
|---|---|---|
| JP | 2019-015376 | 1/2019 |
| WO | 2019/049993 | 3/2019 |
| WO | 2019/049995 | 3/2019 |

OTHER PUBLICATIONS

U.S. Appl. No. 16/811,170, inventor: Kamio, entitled "Shift Range Control Device", filed Mar. 6, 2020, N&V Docket No. 2018-4195 (29 pages).
U.S. Appl. No. 16/801,598, filed Feb. 26, 2020, Shift Range Control Device.
U.S. Appl. No. 16/807,568, filed Mar. 3, 2020, Shift Range Control Device.
U.S. Appl. No. 16/811,170, filed Mar. 6, 2020, Shift Range Control Device.

* cited by examiner

SHIFT RANGE CONTROL DEVICE

CROSS REFERENCE TO RELATED APPLICATIONS

The present application is a continuation application of International Patent Application No. PCT/JP2018/032528 filed on Sep. 3, 2018, which designated the U.S. and claims the benefit of priority from Japanese Patent Application No. 2017-170342 filed on Sep. 5, 2017. The entire disclosures of all of the above applications are incorporated herein by reference.

TECHNICAL FIELD

The present disclosure relates to a shift range control device.

BACKGROUND

A motor control device may switch a shift range by controlling a motor in response to a shift range switching request from a driver. For example, an output shaft sensor may be provided for detecting a rotation angle of an output shaft fitted and coupled to a rotating shaft of a speed reduction mechanism, which reduces and transmits rotation of a motor.

SUMMARY

The present disclosure describes a shift range control device for switching a shift range.

BRIEF DESCRIPTION OF DRAWINGS

The above object and other objects, features, and advantages of the present disclosure will become more apparent from the following detailed description with reference to the accompanying drawings. In the drawing.

DETAILED DESCRIPTION OF EMBODIMENTS

A potentiometer in which an output voltage corresponding to a rotation angle changes linearly may be provided as an output shaft sensor, or a switch that turns on in a rotation angle range corresponding to each range may be provided as an output shaft sensor. The potentiometer and switch are of a contact type. For example, when the output shaft sensor is multiplexed in order to satisfy a relatively high demand for safety, it may be necessary to change a structure of a range switching mechanism. When a relatively simple configuration is provided to multiplex the output shaft sensor, it may be difficult to determine the shift range appropriately. It is an object of the present disclosure to provide a shift range control device determining a shift range appropriately.

The shift range control device according to the present disclosure controls a shift range switching system. The shift range switching system switches a shift range of a vehicle by controlling the drive of a motor. The shift range control device includes an angle calculation unit, a signal acquisition unit, a drive control unit, and a range determination unit. The angle calculation unit acquires a motor rotation angle signal, which is output from a motor rotation angle sensor detecting a rotational position of a motor, and calculates a motor angle. The signal acquisition unit acquires an output shaft signal from an output shaft sensor. The output shaft signal has a value changing stepwise in accordance with a rotational position of an output shaft. The output shaft sensor detects a rotational position of an output shaft to which the rotation of the motor is transmitted. The drive control unit controls the drive of the motor, such that the motor angle becomes a target motor angle value corresponding to a target shift range.

The actual range determination unit determines an actual range as an actual shift range based on the output shaft signal and the motor rotation angle signal. The actual range determination unit determines the actual range based on the output shaft signal and the motor rotation angle signal during switching of the shift range. The actual range determination unit determines the actual range based on the output shaft signal after the switching of the shift range is completed. For example, even when it is configured such that the output shaft signal changes stepwise so as to multiplex the output shaft sensor, it is possible to appropriately determine the shift range by using the motor rotation angle signal in combination.

First Embodiment

Figure 1:
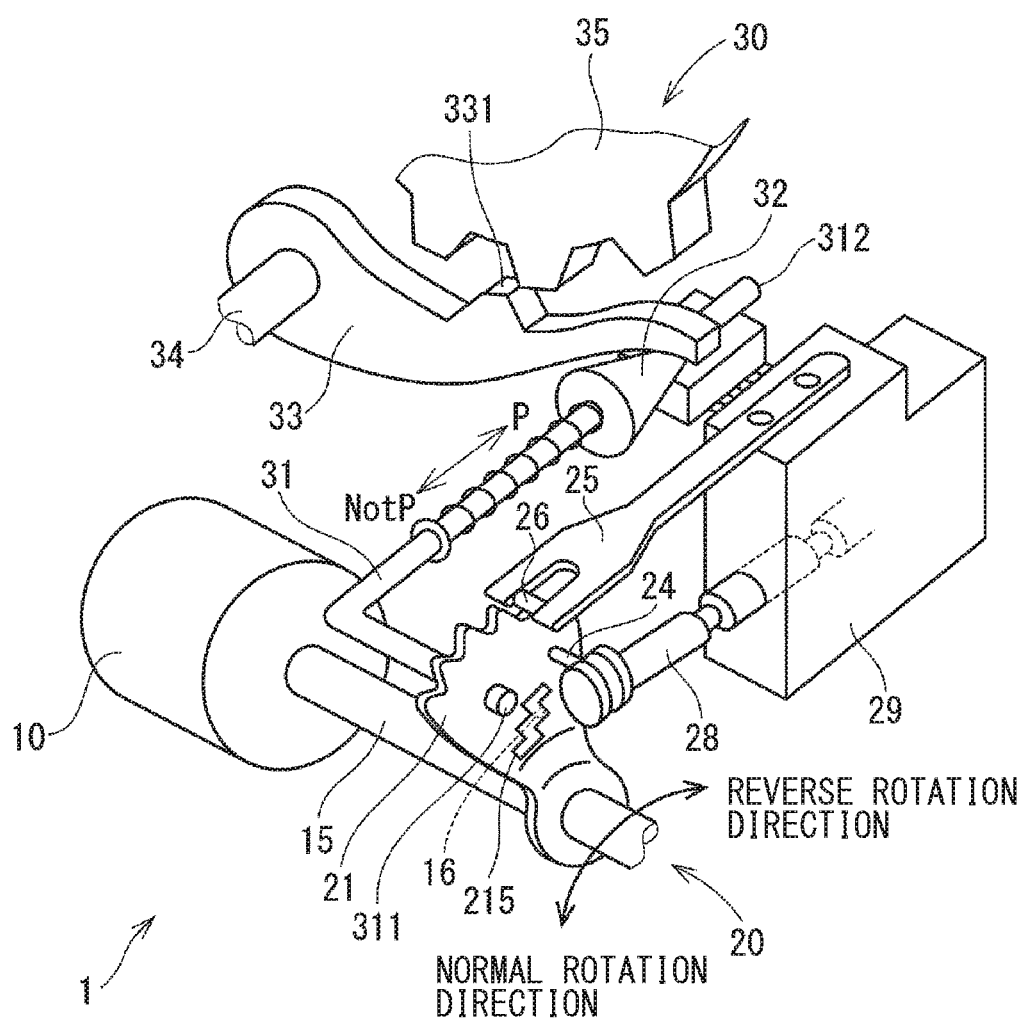
FIG. 1 is a perspective view showing a shift-by-wire system according to a first embodiment.
Figure 2:
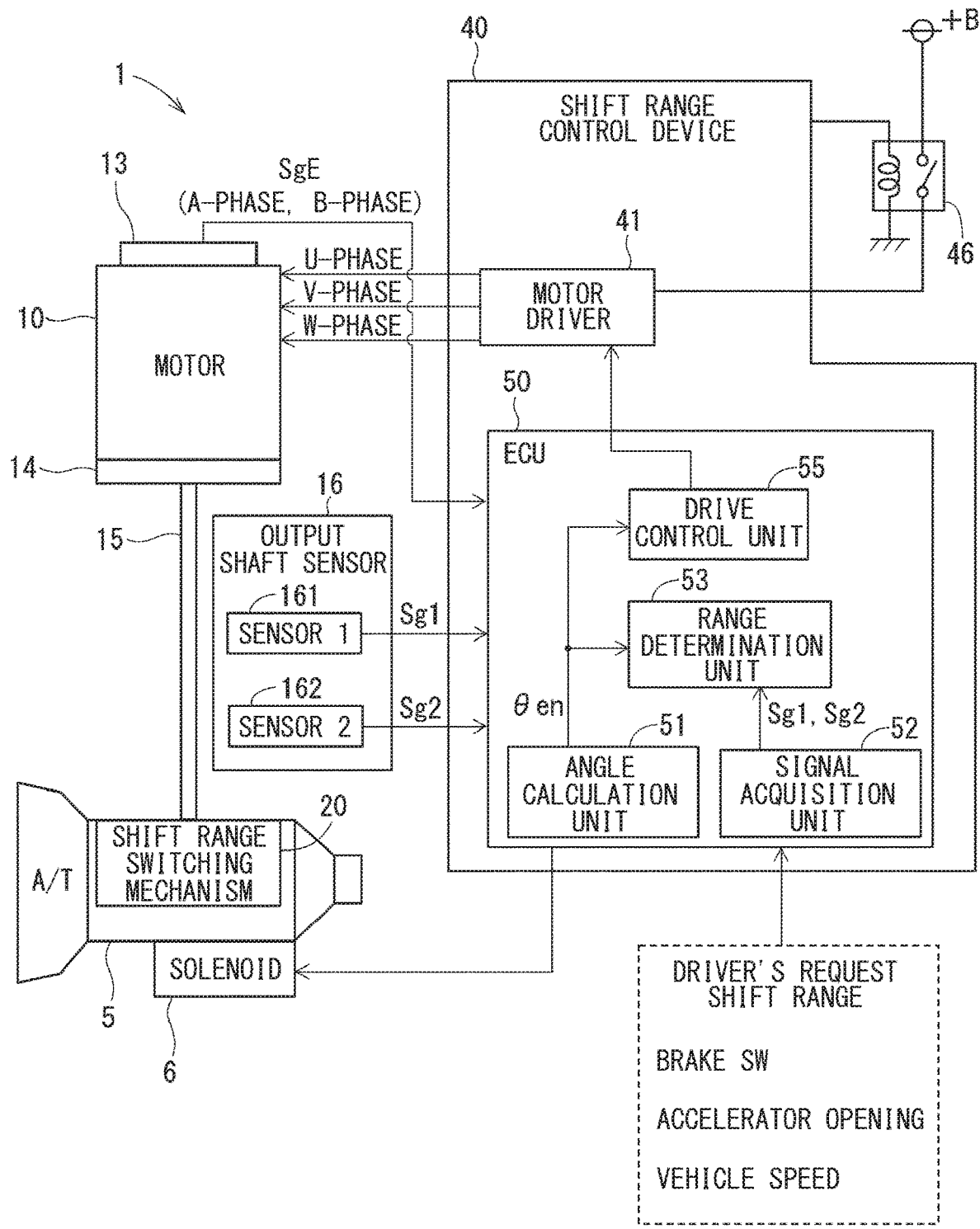
FIG. 2 is a schematic configuration diagram showing the shift-by-wire system according to the first embodiment.

The following describes a shift range control device with reference to the drawings. A shift range control device according to first embodiment is shown in FIGS. 1 to 12. As shown in FIGS. 1 and 2, a shift-by-wire system 1 as a shift range switching system includes a motor 10, a shift range switching mechanism 20, a parking lock mechanism 30, a shift range control device 40, and the like. The motor 10 rotates by being supplied with electric power from a battery mounted in a vehicle (not shown). The motor 10 functions as a drive source for the shift range switching mechanism 20. The motor 10 of the present embodiment is a switched reluctance motor. The switched reluctance motor may be referred to as an "SR motor" as needed. The motor 10 may not only be limited to the SR motor, but also may be a direct-current (DC) brushless motor or the like.

As shown in FIG. 2, an encoder 13 as a motor rotation angle sensor detects a rotational position of a rotor (not shown) of the motor 10. The encoder 13 is, for example, a magnetic rotary encoder and is made up of a magnet that rotates integrally with the rotor, a magnetic detection hall integrated circuit (IC), and the like. The encoder 13 outputs pulse signals of an A-phase and a B-phase at predetermined angles in synchronization with the rotation of the rotor. The signal from the encoder 13 may be referred to as a motor rotation angle signal SgE. In the present embodiment, the encoder 13 is configured by a single system that outputs one signal for each of the A-phase and the B-phase. In the present embodiment, the encoder 13 has higher angle detection accuracy than the output shaft sensor 16.

A speed reducer 14 is provided between a motor shaft of the motor 10 and an output shaft 15. The speed reducer 14 decelerates the rotation of the motor 10, and outputs the rotation to the output shaft 15. The rotation of the motor 10 is transmitted to the shift range switching mechanism 20.

The output shaft sensor 16 includes a first sensor unit 161 and a second sensor unit 162. The output shaft sensor 16 detects a rotational position of the output shaft 15. The output shaft sensor 16 of the present embodiment is a magnetic sensor that detects a change in a magnetic field of a target 215 (see FIG. 1) in a non-contact manner. The output shaft sensor 16 is attached to a location where the magnetic field of the target 215 is detectable. The target 215 is provided on a detent plate 21 as a rotating member to be described hereinafter. In the figure, a first sensor unit 161 may be referred to as a "sensor 1," and a second sensor unit 162 may be referred to as a "sensor 2."

The sensor units 161, 162 are so-called MR sensors having a magnetoresistive effect element (MR element) that detects a change in the magnetic field of the target 215. The first sensor unit 161 detects the magnetic field of the target 215 corresponding to the rotational position. The first sensor unit 161 outputs an output shaft signal Sg1 to an engine control unit (ECU) 50 to be described later. The second sensor unit 162 detects the magnetic field of the target 215 corresponding to the rotational position. The second sensor unit 162 outputs an output shaft signal Sg2 to the ECU 50. The output shaft sensor 16 of the present embodiment includes two sensor units 161, 162, which independently transmit output shaft signals Sg1, Sg2 to the ECU 50. The output shaft sensor 16 is a duplex system.

In the present embodiment, the output shaft sensor 16 is a magnetic sensor that detects a change in the magnetic field of the target 215 in a non-contact manner. The output shaft signals Sg1, Sg2 may be easily multiplexed without significantly changing the configuration on the actuator side as compared to a contact type sensor. By multiplexing (duplication in the present embodiment) of the output shaft signals Sg1, Sg2, it is possible to satisfy requirements for relatively high safety, so that the output shaft signals Sg1, Sg2 are suitably used for fault monitoring such as diagnosis and fail-safe of the shift-by-wire system 1.

As shown in FIG. 1, the shift range switching mechanism 20 includes the detent plate 21, a detent spring 25, and the like and transmits a rotational driving force, which is output from the speed reducer 14, to a manual valve 28 and the parking lock mechanism 30.

The detent plate 21 is fixed to the output shaft 15. The detent plate 21 rotates integrally with the output shaft 15 by the drive of the motor 10. In the present embodiment, a direction in which the detent plate 21 is separated from the base of the detent spring 25 is defined as a normal rotation direction, and a direction in which the detent plate 21 approaches the base of the detent spring 25 is defined as a reverse rotation direction.

The detent plate 21 is provided with a pin 24. The pin 24 protrudes in parallel with the output shaft 15. The pin 24 is connected to the manual valve 28. The detent plate 21 is driven by the motor 10. The manual valve 28 reciprocates in an axial direction. The shift range switching mechanism 20 converts the rotational motion of the motor 10 into linear motion, and transmits the linear motion to the manual valve 28. The manual valve 28 is provided on a valve body 29. A hydraulic pressure supply path to a hydraulic clutch (not shown) is switched by the reciprocating motion of the manual valve 28 in the axial direction. The shift range is changed by the switching of the engagement state of the hydraulic clutch.

Figure 3:
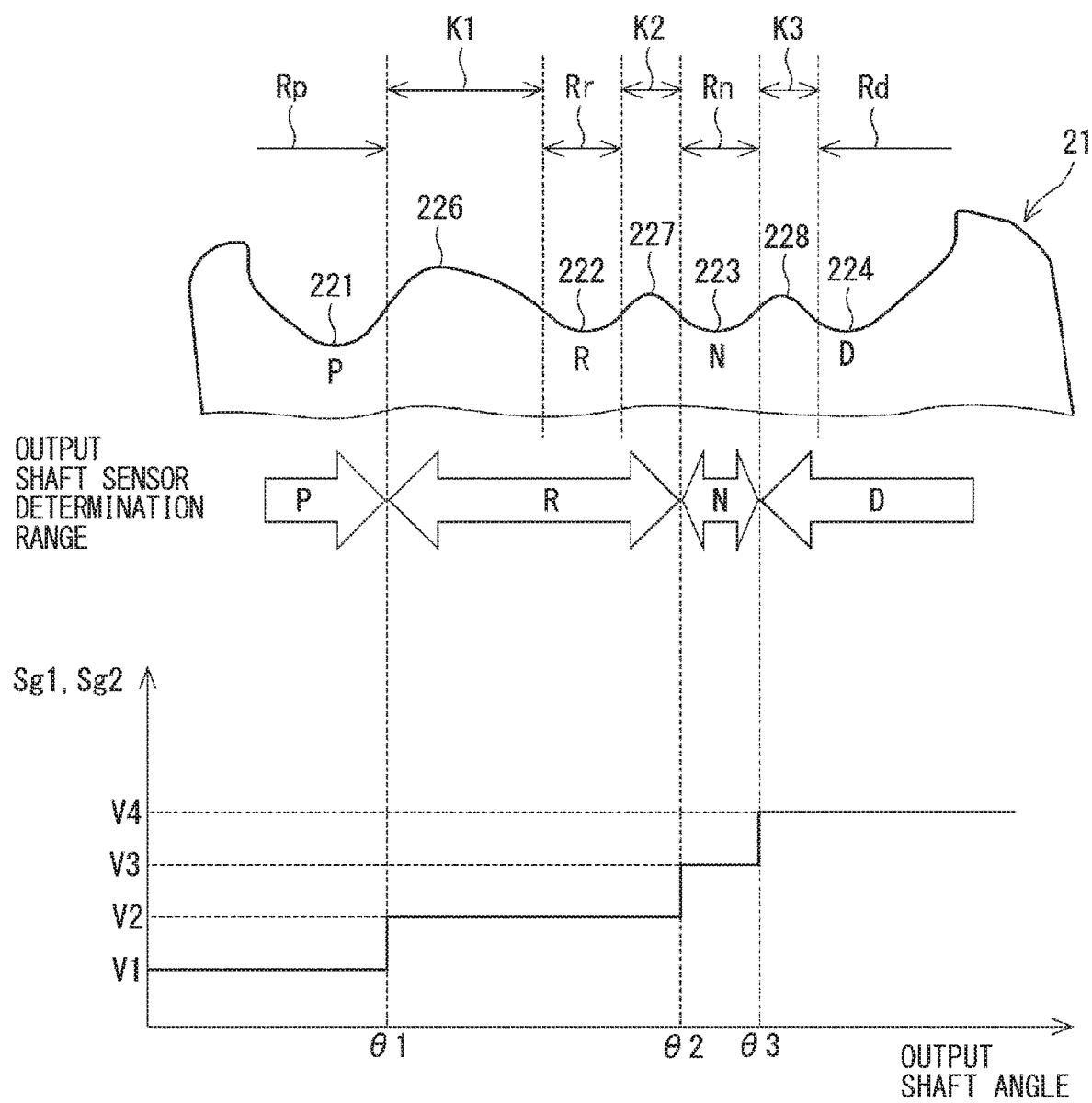
FIG. 3 is a diagram for illustrating an output shaft signal according to the first embodiment.
Figure 4:
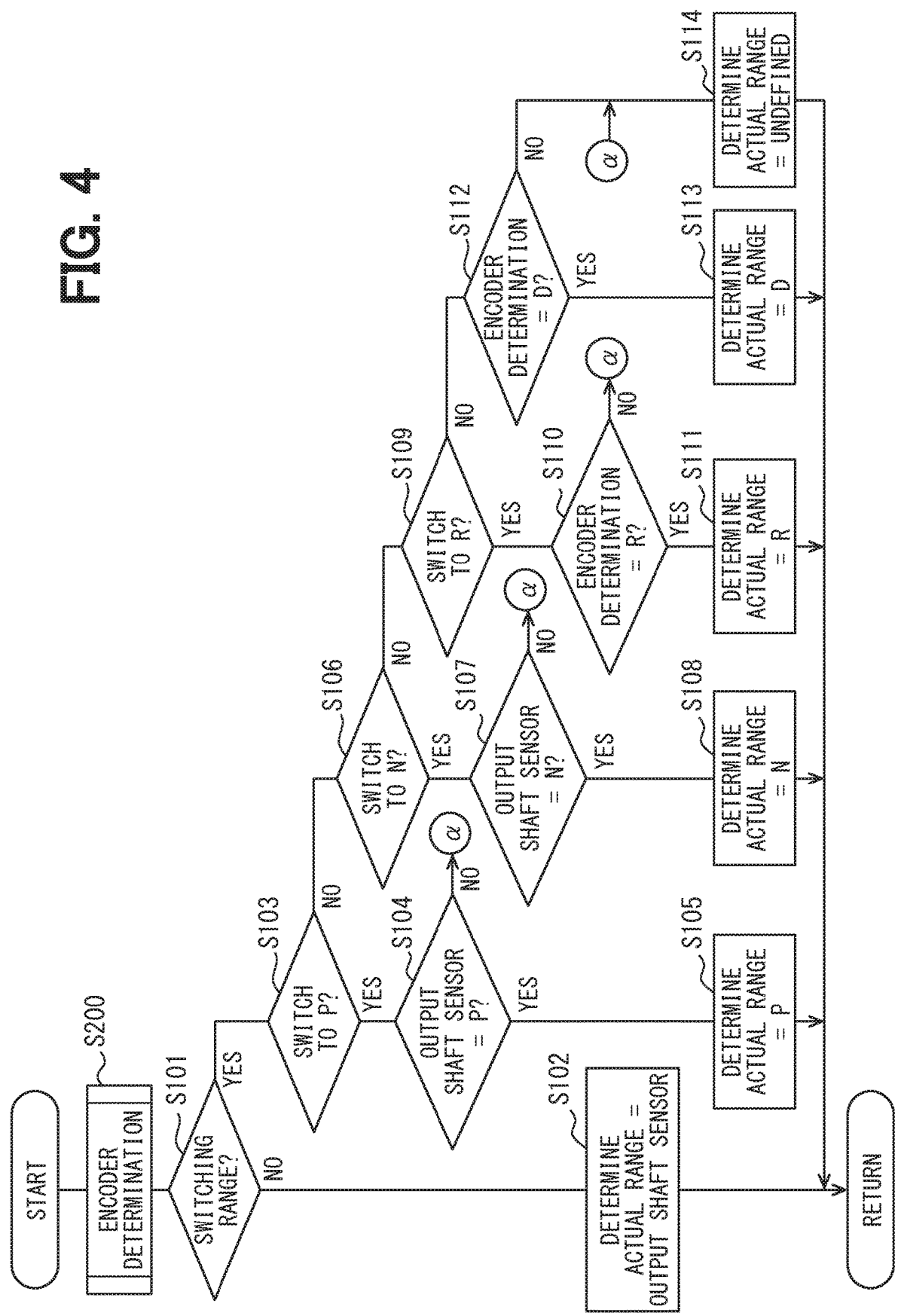
FIG. 4 is a flowchart for illustrating actual range determination processing according to the first embodiment.

As schematically shown in FIG. 3, four valleys 221 to 224 are provided on the detent spring 25 side of the detent plate 21. The valleys 221 to 224 correspond to parking (P), reverse (R), neutral (N), and drive (D) ranges. A peak 226 is provided between the valley 221 corresponding to the P range and the valley 222 corresponding to the R range. A peak 227 is provided between the valley 222 corresponding to the R range and the valley 223 corresponding to the N range. A peak 228 is provided between the valley 223 corresponding to the N range and the valley 224 corresponding to the D range.

As shown in FIG. 1, the detent plate 21 is provided with the target 215 formed of a magnetic material. The magnetic field detected by the output shaft sensor 16 changes due to the rotation of the detent plate 21. The target 215 may be a separate member from the detent plate 21 or may be formed by, for example, being pressed to the detent plate 21 when the detent plate 21 is a magnetic material. The target 215 is formed such that output voltages that are the output shaft signals Sg1, Sg2 of the output shaft sensor 16 change stepwise in accordance with the rotational position of the output shaft 15. The details of the output shaft signals Sg1, Sg2 will be described later.

The detent spring 25 is an elastically deformable plate-like member. The detent spring 25 has a detent roller 26 as an engaging member provided at the tip of the detent spring 25. The detent roller 26 is fitted into any one of the valleys 221 to 224. In the present embodiment, since the number of the valleys 221 to 224 formed on the detent plate 21 is four, the number of engagement positions where the detent roller 26 is engaged is four.

The detent spring 25 biases the detent roller 26 toward the revolving center of the detent plate 21. When a rotational force equal to or greater than a predetermined force is applied to the detent plate 21, the detent spring 25 is elastically deformed, and the detent roller 26 moves among the valleys 221 to 224. When the detent roller 26 is fitted into any one of the valleys 221 to 224, a swing of the detent plate 21 is restricted. An axial position of the manual valve 28 and the state of the parking lock mechanism 30 are determined. The shift range of an automatic transmission 5 is fixed.

The parking lock mechanism 30 includes a parking rod 31, a cone 32, a parking lock pole 33, a shaft portion 34, and a parking gear 35. The parking rod 31 is formed in a substantially L shape, and one end 311 side is fixed to the detent plate 21. The cone 32 is provided on the other end 312 side of the parking rod 31. The cone 32 is formed so as to decrease in diameter toward the other end 312 side. When the detent plate 21 swings in the reverse rotation direction, the cone 32 moves in a direction of arrow P.

The parking lock pole 33 is in contact with the conical surface of the cone 32. A protrusion 331, which meshes with the parking gear 35, is provided at a side of the parking lock pole 33 near the parking gear 35 so as to be able to swing around the shaft portion 34. When the detent plate 21 rotates in the reverse rotation direction and the cone 32 moves in the direction of arrow P, the parking lock pole 33 is pushed up, and the protrusion 331 and the parking gear 35 mesh with each other. When the detent plate 21 rotates in the normal rotation direction and the cone 32 moves in a direction of arrow NotP, the engagement between the protrusion 331 and the parking gear 35 is released.

The parking gear 35 is provided on an axle (not shown) and is provided so as to be able to mesh with the protrusion 331 of the parking lock pole 33. The parking gear 35 and the protrusion 331 mesh with each other. The rotation of the axle is restricted. When the shift range is a not-P range that is a range except for P, the parking gear 35 is not locked by the parking lock pole 33, and the rotation of the axle is not hindered by the parking lock mechanism 30. When the shift range is the P range, the parking gear 35 is locked by the parking lock pole 33, and the rotation of the axle is restricted.

As shown in FIG. 2, the shift range control device 40 includes a motor driver 41, the ECU 50, and the like. The motor driver 41 has a switching element (not shown), and switches energization to each phase (U-phase, V-phase, W-phase) of the motor 10 by turning on and off the switching element based on a command from the ECU 50. The motor 10 is driven. A motor relay 46 is provided between the motor driver 41 and the battery. The motor relay 46 is turned on when the vehicle start switch such as an ignition switch is on, and electric power is supplied to the motor 10 side. The motor relay 46 is turned off when the start switch is off, and the supply of the electric power to the motor 10 side is cut off.

The ECU 50 includes a microcomputer or the like. The ECU 50 includes a central processing unit (CPU), a read-only memory (ROM), an input/output (I/O) (not shown), a bus line connecting these devices, and the like. Each processing in the ECU 50 may be software processing executed by the CPU executing a program stored in advance in a tangible memory device (i.e., a readable non-transitory tangible recording medium) such as a ROM, or may be hardware processing executed by a dedicated electronic circuit.

The ECU 50 controls the switching of the shift range by controlling the drive of the motor 10 based on the driver's request shift range, a signal from a brake switch, a vehicle speed, and the like. The ECU 50 controls the drive of a transmission hydraulic control solenoid 6 based on the vehicle speed, an accelerator opening, the driver's request shift range, and the like. A gear stage is controlled by controlling the transmission hydraulic control solenoid 6. The number of transmission hydraulic control solenoids 6 is provided in accordance with the number of gear stages. In the present embodiment, one ECU 50 controls the drive of the motor 10 and the drive of the solenoid 6, but a motor ECU for controlling the motor 10 and an automatic transmission (AT)-ECU for controlling the solenoid may be separated.

The ECU 50 includes an angle calculation unit 51, a signal acquisition unit 52, a range determination unit 53, a drive control unit 55, and the like. The angle calculation unit 51 calculates an encoder count value θen that is a count value of the encoder 13 based on the motor rotation angle signal SgE output from the encoder 13. The encoder count value θen is a value corresponding to an actual mechanical angle and electrical angle of the motor 10. In the present embodiment, the encoder count value θen corresponds to the "motor angle." In the present embodiment, it is assumed that the rotation direction of the motor 10 at the time of switching the shift range from the P range to another range is positive. It is assumed that the rotation direction of the motor 10 at the time of switching from the D range to another range is negative. The encoder count value θen is counted up by the motor 10 rotating in a positive direction. The encoder count value θen is counted down by the motor 10 rotating in a negative direction.

The signal acquisition unit 52 acquires the output shaft signals Sg1, Sg2 output from the output shaft sensor 16. In the present embodiment, the output shaft signals Sg1, Sg2 are acquired directly from the output shaft sensor 16, but may be acquired from another ECU or the like via a vehicle communication network such as a controller area network (CAN). The range determination unit 53 determines an actual range that is an actual shift range based on the encoder count value θen and the output shaft signals Sg1, Sg2.

The drive control unit 55 controls the drive of the motor 10 by feedback control or the like so that the motor 10 stops at a rotational position where the encoder count value θen becomes a target count value θcmd corresponding to a target shift range. In the present embodiment, the target count value θcmd corresponds to the "target motor angle value." The details of the drive control for the motor 10 may be anything.

The following describes the output shaft signals Sg1, Sg2 with reference to FIG. 3. In FIG. 3, the detent plate 21 is schematically shown in the upper stage, and the output shaft signals Sg1, Sg2 are shown in the lower stage. A region Rp in FIG. 3 indicates a P-lock range in which parking lock by the parking lock mechanism 30 is guaranteed, when the detent roller 26 (not shown in FIG. 3) has an output shaft angle within the range. A region Rr is an R hydraulic pressure generation range in which hydraulic pressure for the R range is guaranteed by the automatic transmission 5, when the detent roller 26 has an output shaft angle within the range. A region Rd is a D hydraulic pressure generation range in which hydraulic pressure for the D range is guaranteed, when the detent roller 26 has an output shaft angle within the range. A region Rn is a range in which it is guaranteed that no frictional engagement element (not shown) is engaged in an oil passage of the automatic transmission 5 and no hydraulic pressure is generated, when the detent roller 26 has an output shaft angle within the range. The range that corresponds to the N range and in which it is guaranteed that no hydraulic pressure is generated may be referred to as an "N hydraulic pressure generation range" for simplicity. The regions Rp, Rr, Rn, Rd are separated from each other, and the state is switched between the regions. In the present embodiment, the region Rp that is the P-lock range is a range to be determined as the P range. The regions Rr, Rn, Rd that are the respective hydraulic pressure generation ranges of R, N, and D are ranges to be determined as the respective corresponding ranges.

The output shaft angle is an angle corresponding to the rotational position of the output shaft 15. In the present embodiment, an output shaft angle at the time when the detent roller 26 is at a boundary position of the region Rp is θ1, an output shaft angle at the time when the detent roller 26 is at a boundary position on the R range side of the region Rn is θ2, and an output shaft angle at the time when the detent roller 26 is at a boundary position on the D range side of the region Rn is θ3.

When the output shaft angle is less than the angle θ1, the output shaft signals Sg1, Sg2, which are output voltages output from the sensor units 161, 162 of the output shaft sensor 16, are constant at a value V1. When the output shaft angle becomes the angle θ1, the output shaft signals Sg1, Sg2 change from the value V1 to a value V2. In a range where the output shaft angle is the angle θ1 or greater and less than the angle θ2, the output shaft signals Sg1, Sg2 are constant at the value V2. When the output shaft angle becomes the angle θ2, the output shaft signals Sg1, Sg2 change from the value V2 to a value V3. In a range where the output shaft angle is the angle θ2 or greater and less than the angle θ3, the output shaft signals Sg1, Sg2 are constant at the value V3. When the output shaft angle becomes the angle θ3, the output shaft signals Sg1, Sg2 change to a value V4. When the output shaft angle is the angle θ3 or greater, the output shaft signals Sg1, Sg2 are constant at the value V4.

The range determination unit 53 sets an output shaft sensor determination range to the P range when the output shaft signals Sg1, Sg2 are the value V1. The range determination unit 53 sets the determination range to the R range when the output shaft signals are the value V2. The range determination unit 53 sets the determination range to the N range when the output shaft signals are the value V3. The range determination unit 53 sets the determination range to the D range when the output shaft signals are the value V4.

In the present embodiment, the range, in which the output shaft sensor determination range is the P range, is matched with the region Rp to be determined as the P range. The range, in which the output shaft sensor determination range is the N range, is matched with the region Rn to be determined as the N range. The range, in which the output shaft sensor determination range is the R range, is wider than the region Rr to be determined as the R range. The range, in which the output shaft sensor determination range is the D range, is wider than the region Rd to be determined as the D range.

An angle design value K1 is between (i) a position where the output shaft signals Sg1, Sg2 are switched from the value V1 to the value V2 and (ii) the P-range-side end of the region Rn. The angle design value K1 is stored in advance into the ROM (not shown) or the like. An angle design value K2 is between (i) the N-range-side end of the region Rn and (ii) a position where the output shaft signals Sg1, Sg2 are switched from the value V2 to the value V3. The angle design value K2 is stored in advance into the ROM or the like. An angle design value K3 between (i) a position where the output shaft signals Sg1, Sg2 are switched from the value V3 to the value V4 and (ii) the end of the region Rd. The angle design value K3 is stored in advance into the ROM or the like. The angle design value K1 is an encoder count value corresponding to 10° in the output shaft angle, for example. The angle design values K2 and K3 are encoder count values corresponding to 2° in the output shaft angle, for example. The angle design values K1, K2, K3 may be set to any value in accordance with the position where the values of the output shaft signals Sg1, Sg2 are switched, the shape of the detent plate 21, and the like.

The possible values V1, V2, V3, V4 that may be determined by the output shaft signals Sg1, Sg2 are discrete, and a median value of each value is not taken. The difference between the value V1 and the value V2, the difference between the value V2 and the value V3, and the difference between the value V3 and the value V4 are each set to be a sufficiently large value as compared to resolution, a sensor error, and the like. According to the present embodiment, shifting of the value from the first value to the second value, the first value being different from the second value to such an extent that the two values may not be regarded as a continuous value, as the detent roller 26 moves among the valleys 221 to 224 is defined as "the value changes stepwise." The difference between the value V1 and the value V2, the difference between the value V2 and the value V3, and the difference between the value V3 and the value V4 may be the same or different. In the present embodiment, a description will be made assuming V1<V2<V3<V4, but the magnitude relationship among the values V1 to V4 may be different.

In the present embodiment, the number of engagement positions of the detent roller 26 is four. The output shaft sensor 16 and the target 215 are provided so that the output shaft signals Sg1, Sg2 change in four stages in accordance with the engagement position of the detent roller 26. In the present embodiment, the number of engagement positions is matched with the number of output voltage stages that may be taken by the output shaft signals Sg1, Sg2. For example, as a reference example, when the output shaft signal is an analog signal that continuously changes in accordance with the rotational position of the output shaft 15, processing such as analog-to-digital (AD) conversion is required. In the present embodiment, the output shaft signals Sg1, Sg2 change stepwise in accordance with the range. When the number of stages of the output shaft signals Sg1, Sg2 is about four, the processing such as the AD conversion in the output shaft sensor 16 may not be required. The configuration of the output shaft sensor 16 may be simplified. In the following control or the like, either the output shaft signal Sg1 or Sg2 may be used, or an arithmetic value such as an average value using the two values may be used. The following assumes that the output shaft signal Sg1 is used.

The range determination unit 53 determines the actual range based on the encoder count value θen as a value based on a detected value of the motor rotation angle signal SgE, and based on the output shaft signal Sg1. The following describes the details of the actual range determination processing with reference to a flowchart of FIG. 4. The actual range determination processing is executed by the range determination unit 53 at a predetermined cycle. Hereinafter, "step" in step S101 is omitted and simply referred to as "S." This also applies to the other steps.

In S200, encoder determination processing, which is a range determination using the encoder count value θen, is executed. The following describes the details of the encoder determination processing. In S101, the range determination unit 53 determines whether the shift range is being switched. Whether the shift range is being switched is determined by, for example, an energization flag that energizes the motor 10. When it is determined that the shift range is being switched (S101: YES), the processing proceeds to S103. When it is determined that the shift range is not being switched (S101: NO), the processing proceeds to S102. In S102, when the shift range is not being switched, that is, during the time after the switching of the shift range is completed until the next switching of the range is started, the range determination unit 53 regards the output shaft sensor determination range as the actual range based on the output shaft signal Sg1 output from the output shaft sensor 16.

In S103, the range determination unit 53 determines whether the target shift range is the P range and the switching to the P range is being made. When it is determined that the switching to the P range is being executed (S103: YES), the processing proceeds to S104. When it is determined that the switching to the P range is not being executed (S103: NO), the processing proceeds to S106.

In S104, the range determination unit 53 determines whether the output shaft sensor determination range is the P range based on the output shaft signal Sg1 output from the output shaft sensor 16. When it is determined that the output shaft sensor determination range is the P range (S104: YES), the processing proceeds to S105. When it is determined that the output shaft sensor determination range is not the P range (S104: NO), the processing proceeds to S114. In S105, the range determination unit 53 determines that the actual range is the P range.

In S106, when the range is being switched (S101: YES) and it is determined that the switching to the P range is not being executed (S103: NO), the range determination unit 53 determines that the target shift range is the N range and determines whether the switching to the N range is being executed. When it is determined that the switching to the N range is being executed (S106: YES), the processing proceeds to S107. When it is determined that the switching to the N range is not being executed (S106: NO), the processing proceeds to S109.

In S107, the range determination unit 53 determines whether the output shaft sensor determination range is the N range based on the output shaft signal Sg1 output from the output shaft sensor 16. When it is determined that the output shaft sensor determination range is the N range (S107: YES), the processing proceeds to S108. When it is determined that the output shaft sensor determination range is not the N range (S107: NO), the processing proceeds to S114. In S108, the range determination unit 53 determines that the actual range is the N range.

In S109 to which the processing proceeds when it is determined that the range is being switched (S101: YES) and is not being switched to the P range or the N range (S103: NO, and S106: NO), the range determination unit 53 determines whether the target shift range is the R range and the switching to the R range is being executed. When it is determined that the switching to the R range is being executed (S109: YES), the processing proceeds to S110. When it is determined that the switching to the R range is not being executed (S109: NO), that is, when the target shift range is the D range and the switching to the D range is being executed, the processing proceeds to S112.

In S110, the range determination unit 53 determines whether the encoder determination range is the R range. When it is determined that the encoder determination range is the R range (S110: YES), the processing proceeds to S111. When it is determined that the encoder determination range is not the R range (S110: NO), the processing proceeds to S114. In S111, the range determination unit 53 determines that the actual range is the R range.

In S112 to which the processing proceeds when the switching to the D range is being executed (S109: NO), the range determination unit 53 determines whether or not the encoder determination range is the D range. When it is determined that the encoder determination range is the D range (S112: YES), the processing proceeds to S113. When it is determined that the encoder determination range is not the D range (S112: NO), the processing proceeds to S114. In S113, the range determination unit 53 determines that the actual range is the D range. In S114, the range determination unit 53 determines that the actual range is undefined.

Figure 5:
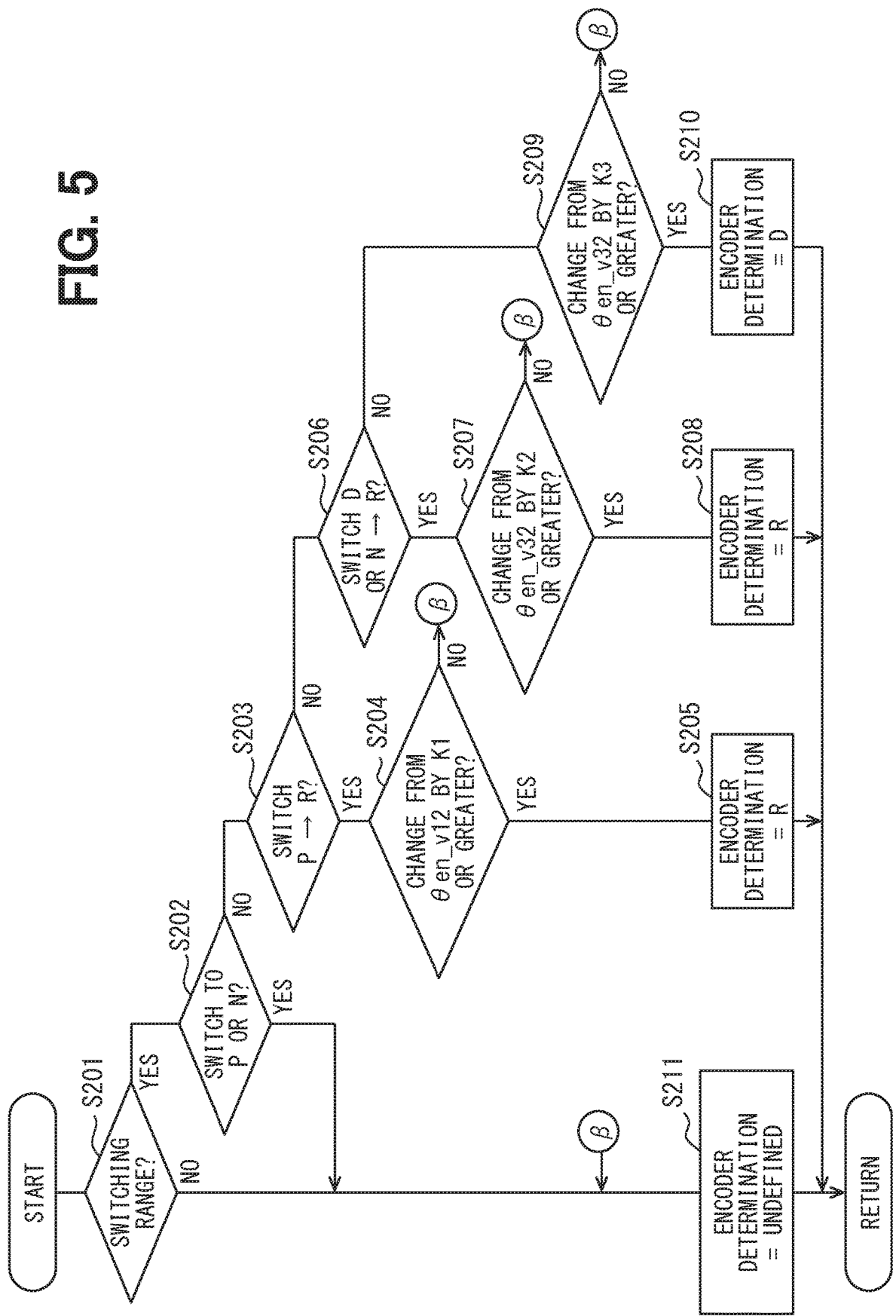
FIG. 5 is a flowchart for illustrating encoder determination processing according to the first embodiment.

The following describes the encoder determination processing with reference to a flowchart of FIG. 5. In S201, the range determination unit 53 determines whether the shift range is being switched. When it is determined that the shift range is being switched (S201: YES), the processing proceeds to S202. When it is determined that the shift range is not being switched (S201: NO), the processing proceeds to S211.

In S202, the range determination unit 53 determines whether the switching to the P range or the N range is being executed. When it is determined that the switching to the P range or N range is being executed (S202: YES), the processing proceeds to S211. In the present embodiment, when the range is not being switched and when the switching to the P range or the N range are being executed, the encoder determination range is not used. The processing proceeds to S211, and the encoder determination range is determined as undefined. When it is determined that the switching to the P range or N range is not being executed (S202: NO), that is, when the switching to the R range or D range is being executed, the processing proceeds to S203.

In S203, the range determination unit 53 determines whether the switching from the P range to the R range is being executed. When it is determined that the switching from the P range to the R range is being executed (S203: YES), the processing proceeds to S204. When it is determined that the switching from the P range to the R range is not being executed (S203: NO), the processing proceeds to S206.

In S204, the range determination unit 53 determines whether the encoder count value θen has changed by the angle design value K1 or greater after the output shaft signal Sg1 has changed from the value V1 to the value V2. It may be assumed that the encoder count value at the time when the output shaft signal Sg1 changes from the value V1 to the value V2 is θen_v12. For example, a positive determination is made when Expression (1) holds, and a negative determination is made when the expression does not hold. θen in the expression is the current encoder count value. When the value of the output shaft signal Sg1 is V1, a negative determination is made.

$$\theta en - \theta en\_v12 \geq K1 \quad (1)$$

When it is determined that the encoder count value θen has changed by the angle design value K1 or greater after the output shaft signal Sg1 has changed from the value V1 to the value V2 (S204: YES), the processing proceeds to S205. When it is determined that the change in the encoder count value θen after the output shaft signal Sg1 has changed from the value V1 to the value V2 is less than the angle design value K1 (S204: NO), the processing proceeds to S211. In S205, the range determination unit 53 sets the encoder determination range to the R range.

In S206, the range determination unit 53 determines whether the switching from the D range or the N range to the R range is being executed. When it is determined that the switching from the D range or N range to the R range is being executed (S206: YES), the processing proceeds to S207. When it is determined that the switching from the D range or the N range to the R range is not being executed (S206: NO), that is, when the switching to the D range is being executed, the processing proceeds to S209.

In S207, the range determination unit 53 determines whether the encoder count value θen has changed by the angle design value K2 or greater, after the output shaft signal Sg1 has changed from the value V3 to the value V2. It may be assumed that the encoder count value at the time when the output shaft signal Sg1 changes from the value V3 to the value V2 is θen_v32. For example, a positive determination is made when Expression (2) holds, and a negative determination is made when the expression does not hold. When the value of the output shaft signal Sg1 is V3 or V4, a negative determination is made.

$$\theta en\_v32 - \theta en \geq K2 \quad (2)$$

When it is determined that the encoder count value θen has changed by the angle design value K2 or greater after the output shaft signal Sg1 has changed from the value V3 to the value V2 (S207: YES), the processing proceeds to S208. When it is determined that the change in the encoder count value θen after the output shaft signal Sg1 has changed from the value V3 to the value V2 is less than the angle design value K2 (S207: NO), the processing proceeds to S211. In S208, the range determination unit 53 sets the encoder determination range to the R range.

In S209 to which the processing proceeds when the switching to the D range is being executed, it is determined whether or not the encoder count value θen has changed by the angle design value K3 or greater, after the output shaft signal Sg1 has changed from the value V3 to the value V4. It may be assumed that the encoder count value at the time when the output shaft signal Sg1 changes from the value V3 to the value V4 is θen_v34. For example, a positive determination is made when Expression (3) holds, and a negative determination is made when the expression does not hold. When the value of the output shaft signal Sg1 is V1, V2, or V3, a negative determination is made.

$$\theta en - \theta en\_v34 \geq K3 \quad (3)$$

When it is determined that the encoder count value θen has changed by the angle design value K3 or greater after the output shaft signal Sg1 has changed from the value V3 to the value V4 (S209: YES), the processing proceeds to S210. When it is determined that the change in the encoder count value θen, after the output shaft signal Sg1 has changed from the value V3 to the value V4, is less than the angle design value K3 (S209: NO), the processing proceeds to S211. In S210, the range determination unit 53 sets the encoder determination range to the D range. In S211, the range determination unit 53 determines the encoder determination range as undefined.

Figure 6:
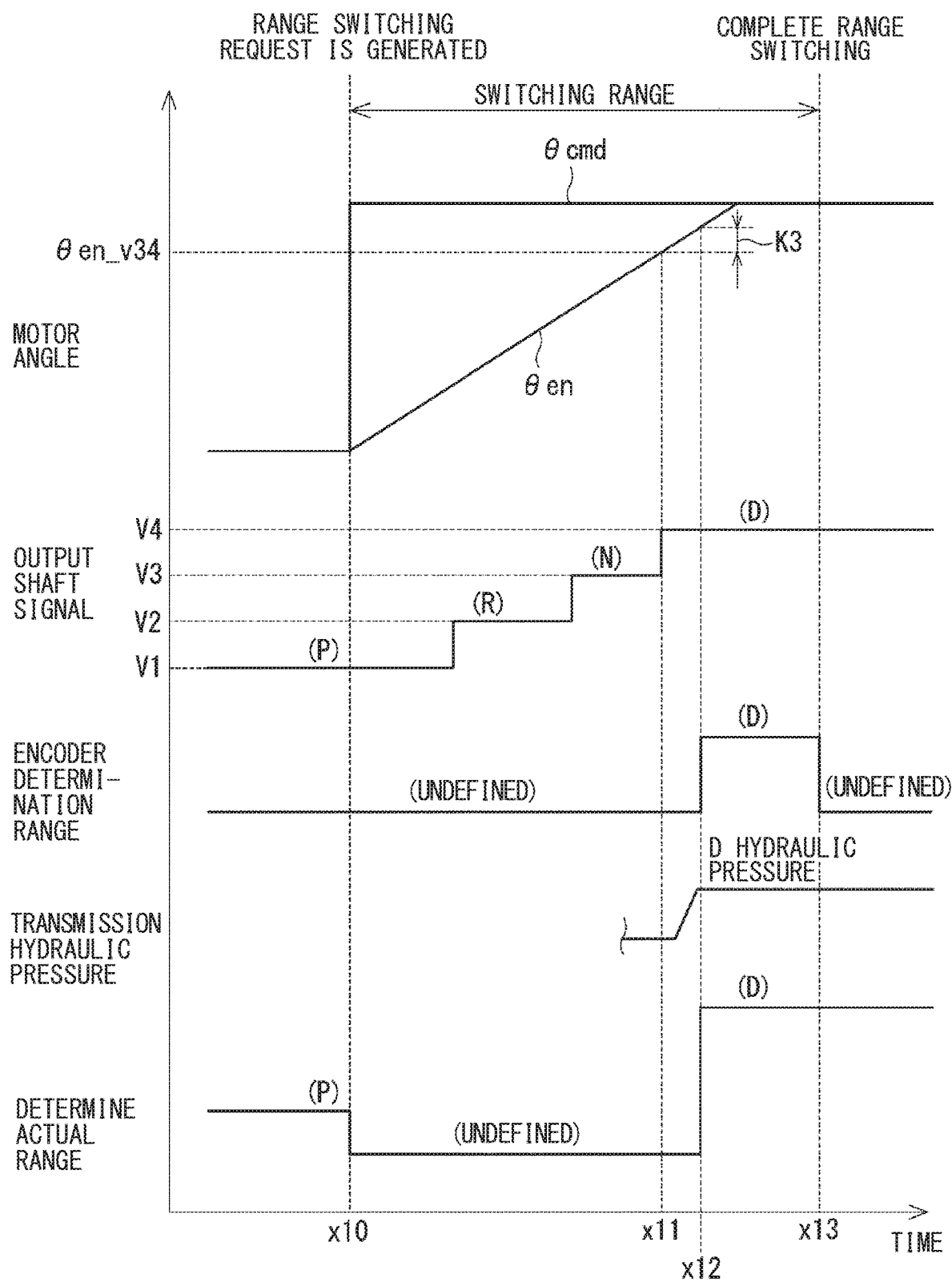
FIG. 6 is a time chart in the case of switching a shift range from a P range to a D range in the first embodiment.
Figure 7:
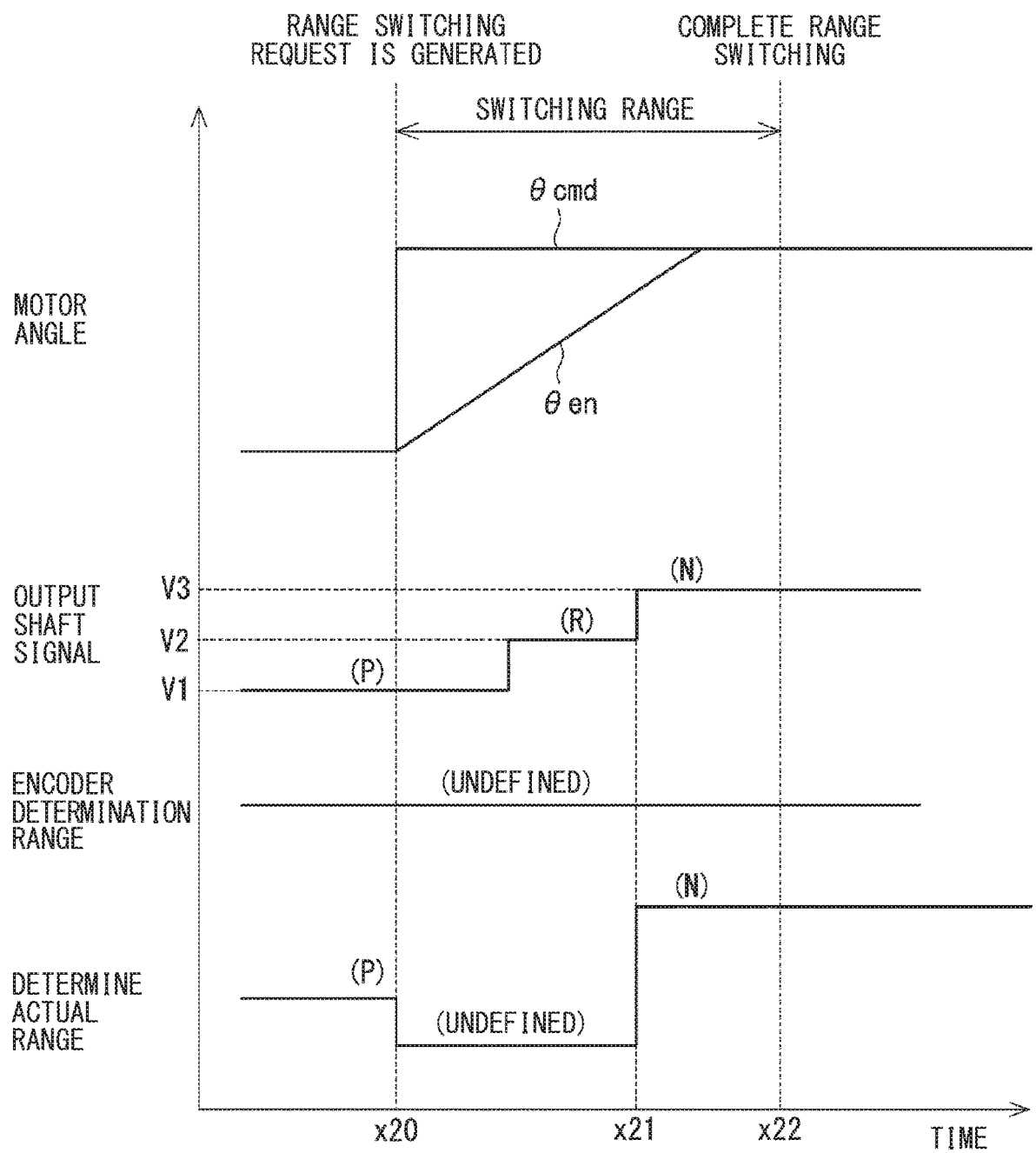
FIG. 7 is a time chart in the case of switching the shift range from the P range to an N range in the first embodiment.

The following describes a particular example of the actual range determination with reference to time charts of FIGS. 6 and 7. As described in FIG. 3, the range, in which the output shaft sensor determination range is the R range, is not matched with the R hydraulic pressure generation range. The range, in which the output shaft sensor determination range is the R range, is wider than the R hydraulic pressure generation range. The range, in which the output shaft sensor determination range is the D range, is not matched with the D hydraulic pressure generation range. The range, in which the output shaft sensor determination range is the D range, is wider than the D hydraulic pressure generation range. In the present embodiment, at the time of switching the shift range to the R range or the D range, the actual range is determined using the encoder determination range.

FIG. 6 is a time chart in the case of switching the shift range from the P range to the D range. FIG. 6 illustrates that a common time-axis is set as the horizontal axis. FIG. 6 shows, from the top, a motor angle, an output shaft signal, an encoder determination range, a transmission hydraulic pressure, and an actual range determination. The output shaft signal includes the output shaft sensor determination range.

When the target shift range is switched from the P range to the D range at time x10, a range switching request is generated. The target count value θcmd corresponding to the target shift range is set, and the motor 10 is driven so that the encoder count value θen becomes the target count value θcmd. When the switching of the shift range starts at time x10, the actual range determination is changed from the P range to the undefined. The encoder determination range is undefined when the shift range is not switched, and remains undefined even when the switching of the shift range starts at time x10.

When the output shaft 15 rotates with the rotation of the motor 10, the value of the output shaft signal Sg1 changes stepwise in the order of V1, V2, and V3 in accordance with the rotational position of the output shaft 15. At time x11, the value of the output shaft signal Sg1 changes from V3 to V4, and the output shaft sensor determination range becomes the D range. Since the range, in which the value V4 is output, is wider than the region Rd to be determined as the D range, the actual range determination is not switched to the D range at this stage but is held undefined.

The encoder determination range is changed from the undefined to the D range at time x12 when the encoder count value θen changes by the angle design value K3 from the encoder count value θen_v34 at the time of change in the value of the output shaft signal Sg1 from V3 to V4 at time x11. When the encoder determination range becomes D range, the actual range determination is switched from the undefined to the D range. In other words, at the time of switching the shift range to the D range, the D range determination is executed based on the output shaft signal Sg1 from the output shaft sensor 16 and the motor rotation angle signal SgE from the encoder 13. At the time of switching to the R range, the R range determination is executed based on the output shaft signal Sg1 from the output shaft sensor 16 and the motor rotation angle signal SgE from the encoder 13. Between time x11 and time x12, the transmission hydraulic pressure changes from N hydraulic pressure to D hydraulic pressure.

When the range switching is completed at time x13, the encoder determination range becomes undefined. After the switching of the shift range is completed, the range determination is executed based on the output shaft signal Sg1 during a period when the range switching is not executed. The output shaft sensor determination range is regarded as the actual range.

As described in FIG. 3, the range, in which the output shaft sensor determination range is the P range, is matched with the P-lock range. The range, in which the output shaft sensor determination range is the N range, is matched with the N hydraulic pressure generation range. In the present embodiment, at the time of switching the shift range to the P range or the N range, the actual range is determined based on the output shaft sensor determination range without using the encoder determination range.

FIG. 7 is a time chart in the case of switching the shift range from the P range to the N range. FIG. 7 shows that the common time-axis is set as the horizontal axis. FIG. 7 shows, from the top, the motor angle, the output shaft signal, the encoder determination range, and the actual range determination. When the target shift range is switched from the P range to the N range at time x20, a range switching request is generated. The target count value θcmd corresponding to the target range is set, and the motor 10 is driven so that the encoder count value θen becomes the target count value θcmd. When the switching of the shift range starts at time x20, the actual range determination is changed from the P range to the undefined.

When the output shaft 15 rotates with the rotation of the motor 10, the value of the output shaft signal Sg1 changes stepwise in the order of V1 and V2 in accordance with the rotational position of the output shaft 15. When the value of the output shaft signal Sg1 changes from V2 to V3 at time x21, the output shaft sensor determination range is switched from the R range to the N range. The actual range determination is switched from the undefined to the N range. At the time of switching the shift range to the N range, the N range determination is executed based on the output shaft signal Sg1 from the output shaft sensor 16 without using the detected value of the encoder 13. At the time of switching to the P range, the P range determination is executed based on the output shaft signal Sg1 from the output shaft sensor 16.

After time x22 when the range switching is completed, the range determination is executed based on the output shaft signal Sg1. The output shaft sensor determination range is regarded as the actual range. When the target shift range is the N range or P range, the range determination is executed based on the detected value of the output shaft sensor 16 without using the detected value of the encoder 13. Hence, the encoder determination range is held undefined during the range switching.

The following describes a functional safety determination using the output shaft sensor determination range with reference to FIGS. 8 to 12. In practice, the detent roller 26 moves due to the rotation of the detent plate 21. For simplifying a description, it may be assumed that the detent roller 26 moves on the detent plate 21. In the present embodiment, the range, where the output shaft sensor determination range is the P range, is matched with the P-lock range. The range, where the output shaft sensor determination range is the N range, is matched with the N hydraulic pressure generation range. When the shift range is not being switched, it may be possible to appropriately perform the determination related to the functional safety by using the output shaft sensor determination range. The following describes a reverse running determination and a P-in fault determination as determinations related to the functional safety.

The following describes the reverse running determination with reference to FIGS. 8 to 11. In FIG. 8 to 12, the detent roller 26 before the range switching is indicated by solid line. The detent roller 26 in the case of appropriate switching to the target shift range is indicated by two-dot chain line. In FIGS. 8 to 12, the numbering of the valleys 221 to 224 and the peaks 226 to 228 is omitted in order to avoid confusion.

Figure 8:
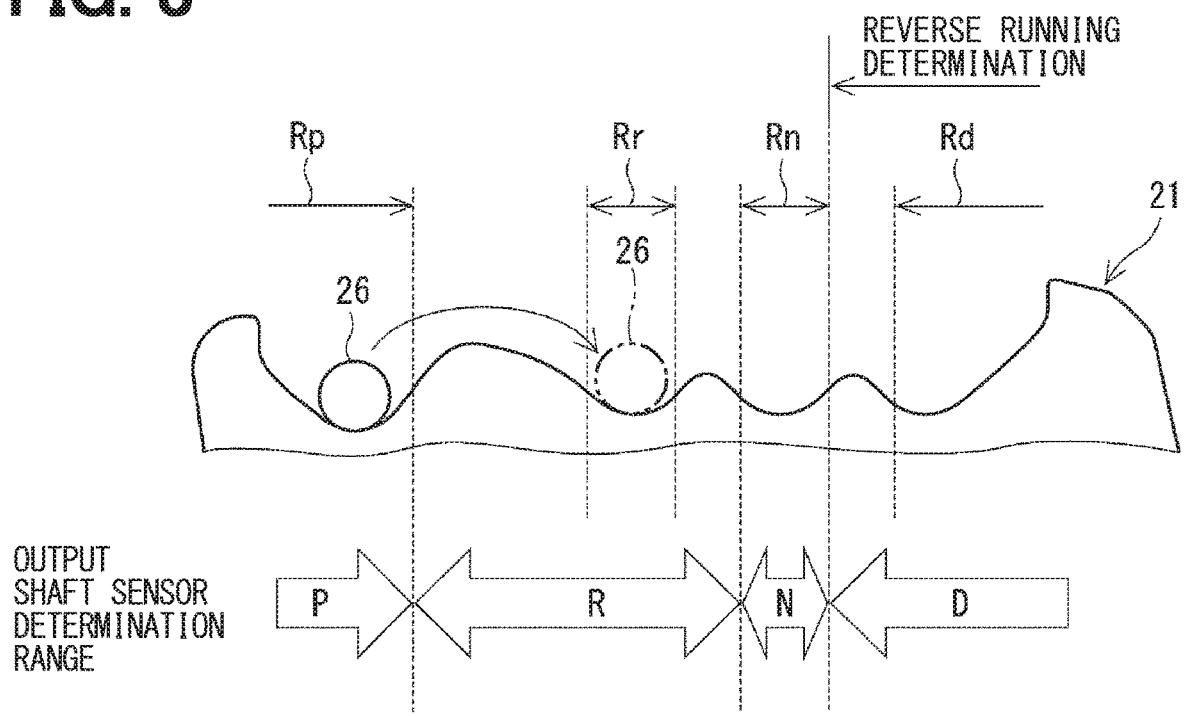
FIG. 8 is a diagram for illustrating a reverse running determination in the case of switching the shift range from the P range to an R range in the first embodiment.
Figure 9:
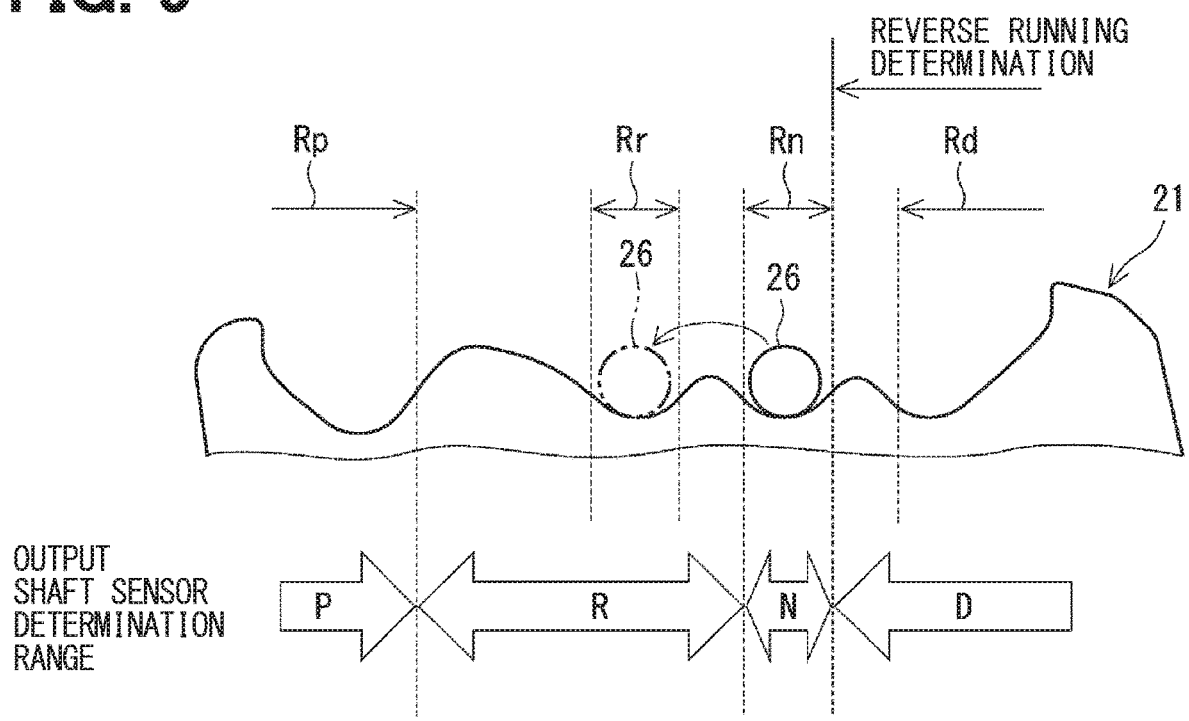
FIG. 9 is a diagram for illustrating the reverse running determination in the case of switching the shift range from the N range to the R range in the first embodiment.

As shown in FIG. 8, in the case of switching the shift range from the P range to the R range, when the output shaft 15 rotates beyond the N hydraulic pressure generation range, there is a possibility that D hydraulic pressure may be generated and that the vehicle may be driven in a direction reverse to the driver's intention. In the present embodiment, when the request is for switching from the P range to the R range and when the output shaft sensor determination range is the D range, the reverse running is determined. As shown in FIG. 9, when the request is for switching from the N range to the R range and when the output shaft sensor determination range is the D range, the reverse running is determined.

Figure 10:
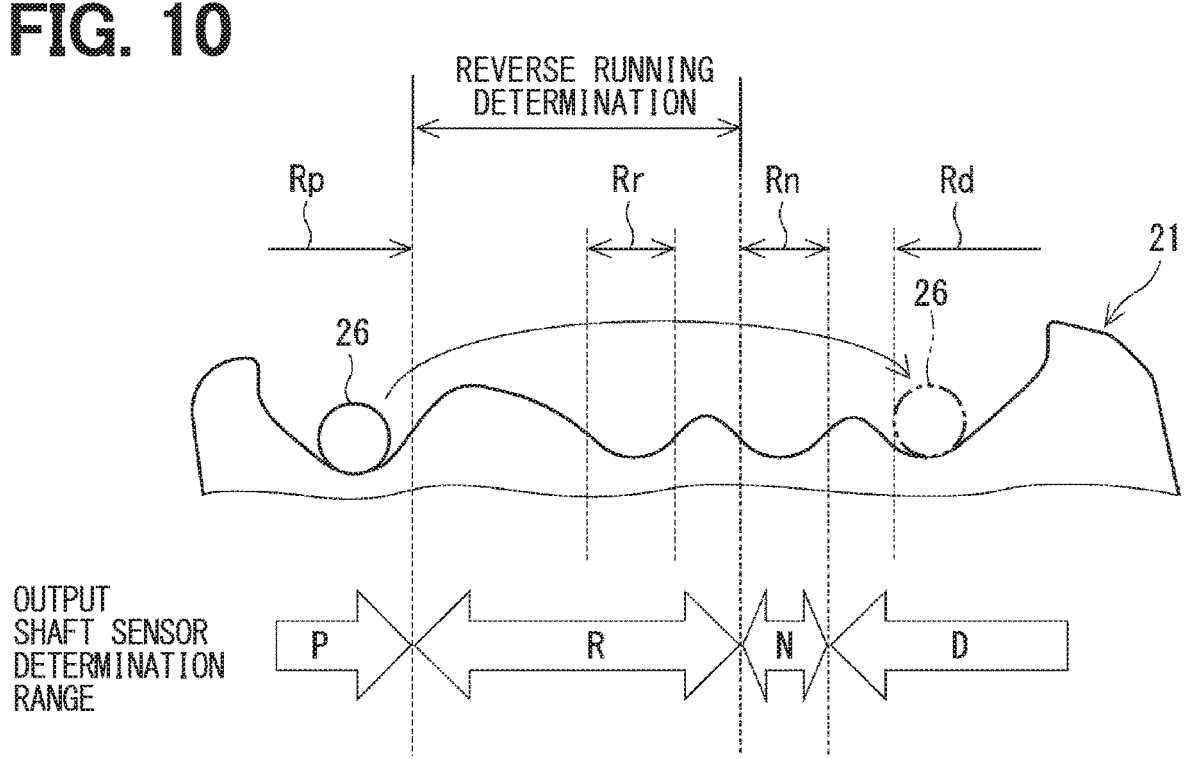
FIG. 10 is a diagram for illustrating the reverse running determination in the case of switching the shift range from the P range to the D range in the first embodiment.
Figure 11:
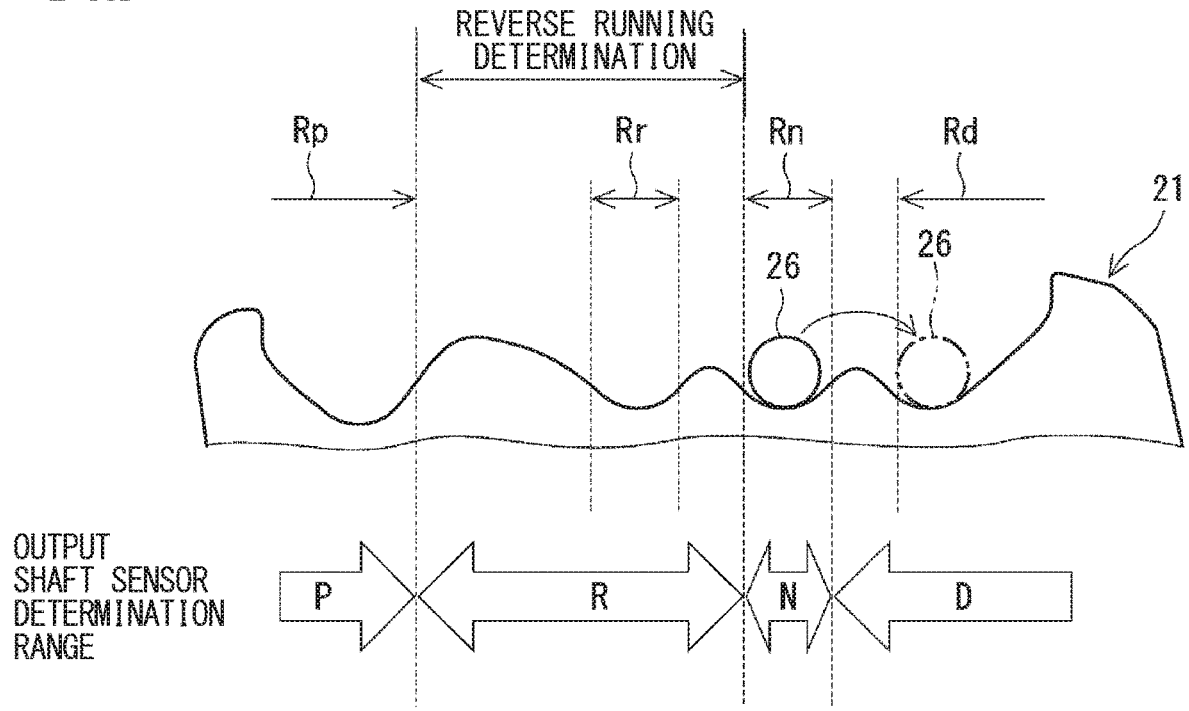
FIG. 11 is a diagram for illustrating the reverse running determination in the case of switching the shift range from the N range to the D range in the first embodiment.

As shown in FIG. 10, in the case of switching the shift range from the P range to the D range, when the output shaft 15 passes through the P-lock range and stagnates before the N hydraulic pressure generation range, R hydraulic pressure may be generated. There may be a possibility that the vehicle is driven in a direction reverse to the driver's intention. In the present embodiment, when the request is for switching from the P range to the D range and when after elapse of the delay time required for passing through the R range, the output shaft sensor determination range is the R range, the reverse running is determined. As shown in FIG. 11, when the request is for switching from the N range to the D range and when the output shaft sensor determination range is the R range, the reverse running is determined. When the reverse running is determined, a vehicle's torque is cut and the user is warned by a warning lamp or the like. It may be possible to appropriately perform the reverse running determination based on the detected value of the output shaft sensor 16.

Figure 12:
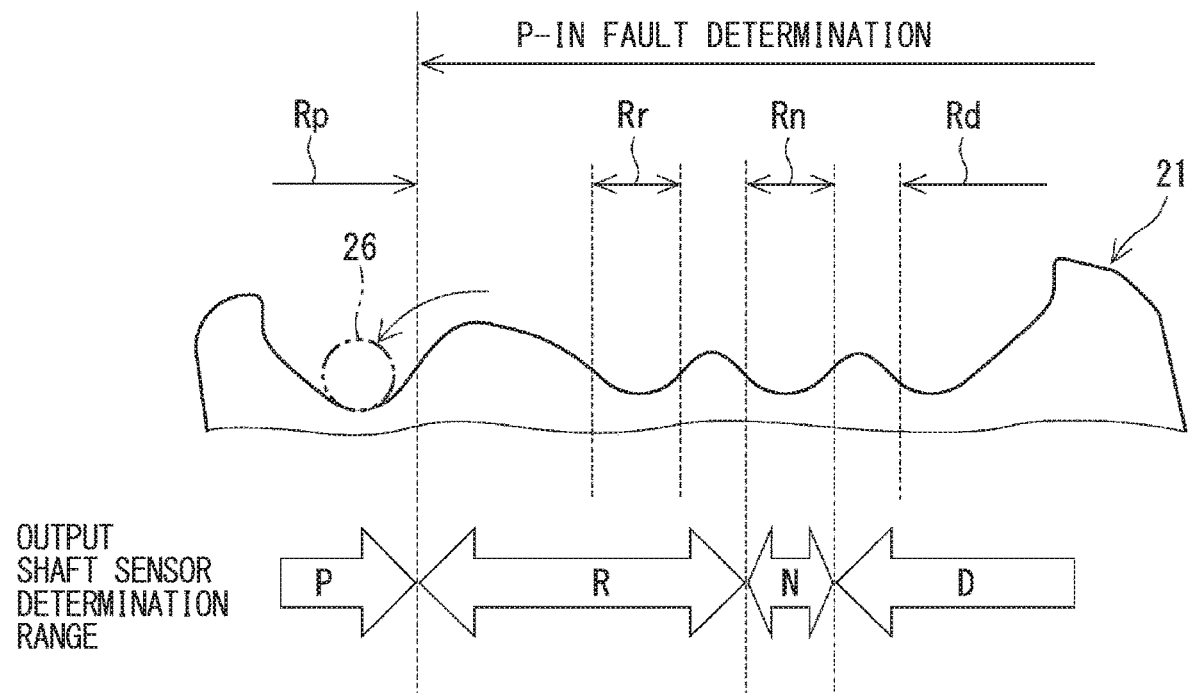
FIG. 12 is a diagram for illustrating a P-in fault determination according to the first embodiment.

The following describes the P-in fault determination with reference to FIG. 12. In the present embodiment, at the time of request for the switching to the P range, when the output shaft sensor determination range is the R range, the N range, or the D range after elapse of the delay time required for passing through the D, N, and R ranges, it is determined that P-in fault in which the switching to the P range may not be executed appropriately has occurred. When it is determined that the P-in fault has occurred, the vehicle's torque is cut, and the user is warned by a warning lamp or the like. The method for warning the user is not limited to the lighting of the warning lamp, but may also be any method such as voice warning. This also applies at the time of reverse running determination.

In the present embodiment, the detected value of the output shaft sensor 16 changes stepwise, and the number (4 in the present embodiment) of detected values that may be output is less than the number (6 in the present embodiment) of boundaries between the P-lock range and the hydraulic pressure generation ranges for the respective ranges. In the present embodiment, it is configured such that the P-lock range and the region determined to be the P range are matched with each other, the N hydraulic pressure generation range and the region determined to be the N range are matched with each other, and the region determined to be the R range and the region determined to be the D range are wider than the R hydraulic pressure generation range and the D hydraulic pressure generation range, respectively. Due to the matching between the P-lock range and the region where the P range is determined and the matching between the N hydraulic pressure generation range and the region where the N range is determined, even when the number of detected values is smaller, it may be possible to appropriately determine the reverse running and the P-in fault based on the detected value of the output shaft sensor 16 without using the detected value of the encoder 13. Therefore, it is possible to ensure the functional safety of the shift-by-wire system 1.

The shift range control device 40 of the present embodiment is for controlling a shift range switching system. The shift range switching system switches the shift range of the vehicle by controlling the drive of the motor 10. The shift range control device 40 includes the angle calculation unit 51, the signal acquisition unit 52, the drive control unit 55, and the range determination unit 53. The angle calculation unit 51 acquires the motor rotation angle signal SgE output from the encoder 13 that detects the rotational position of the motor 10, to calculate the encoder count value θen as a motor angle. The signal acquisition unit 52 acquires the output shaft signals Sg1, Sg2, which are output from the output shaft sensor 16 and have a value changing stepwise in accordance with a rotational position of the output shaft 15. The output shaft sensor 16 detects the rotational position of the output shaft 15 to which the rotation of the motor 10 is transmitted. The drive control unit 55 controls the drive of the motor 10 so that the encoder count value θen becomes the target count value θcmd corresponding to the target shift range.

The range determination unit 53 determines an actual range as an actual shift range based on the output shaft signals Sg1, Sg2 and the motor rotation angle signal SgE. The range determination unit 53 determines the actual range based on the output shaft signals Sg1, Sg2 and the motor rotation angle signal SgE during the switching of the shift range, and determines the actual range based on the output shaft signals Sg1, Sg2 after the switching of the shift range is completed. In other words, the range determination unit 53 performs the range determination based on the output shaft sensor determination range and the encoder determination range during the switching of the shift range, and performs the range determination based on the output shaft sensor determination range without using the encoder determination range after the switching of the shift range is completed.

For example, as in the present embodiment, even when it is configured such that the output shaft signals Sg1, Sg2 change stepwise in order to multiplex the output shaft sensor 16, and even when, for example for at least some of the ranges, the range detection range determined based on the output shaft signals Sg1, Sg2 is wider than the range subjected to the range determination, the shift range may be appropriately determined by using the motor rotation angle signal SgE in combination.

The range, in which the value V1 indicating the P range is output as the output shaft signals Sg1, Sg2, is equal to or less than the range to be determined as the P range. The range, in which the value V3 indicating the N range is output as the output shaft signals Sg1, Sg2, is equal to or less than the range to be determined as the N range. The range, in which the value V2 indicating the R range is output as the output shaft signals Sg1, Sg2, is wider than the range to be determined as the R range. The range, in which the value V4 indicating the D range is output as the output shaft signals Sg1, Sg2, is wider than the range to be determined as the D range.

The range determination unit 53 determines whether the range is the P range or the N range based on the output shaft signals Sg1, Sg2 during the range switching. In other words, the motor rotation angle signal SgE is not used for the P range and N range determination even during the range switching. In addition, the range determination unit 53 determines whether the range is the R range or the D range based on the output shaft signals Sg1, Sg2 and the motor rotation angle signal SgE during the range switching.

The output shaft 15 rotates integrally with the detent plate 21 having four valleys (221 to 224) with which the detent roller 26 is engaged in accordance with each range of the P range, the R range, the N range, and the D range. In the present embodiment, the first range is the P range and the N range, and the second range is the R range and the D range. Further, the value V1 indicating the P range and the value V3 indicating the N range correspond to the "first signal value." The value V2 indicating the R range and the value V4 indicating the D range correspond to the "second signal value."

In the present embodiment, the range determination is possible for the first range without using a signal from the encoder 13 even during the switching of the shift range, so that appropriate range determination may be continued even when an fault occurs in the encoder 13. By setting the first range to the P range and N range, even when the output shaft signals Sg1, Sg2 change stepwise, the reverse running, the P-in fault, and the like may be appropriately determined based on the output shaft signals Sg1, Sg2, and the functional safety of the shift-by-wire system 1 may be ensured. By making it possible to determine the P range and N range without using the information of the encoder 13, the P range and N range may be quickly determined without waiting for initial learning of the encoder 13 during the system start at an ignition (IG)-on position or the like. As a result, processing that may be executed after the P range or N range determination, such as engine cranking may be started quickly, and deterioration in operability of the driver may be prevented.

Other Embodiments

In the above embodiment, the motor is an SR motor. In another embodiment, the motor may be any motor, such as a DC brushless motor. In the above embodiment, the number of winding sets of the motor is not mentioned, but one winding set or multiple winding sets may be used. In the above embodiment, the motor rotation angle sensor is an encoder. In another embodiment, the motor rotation angle sensor may not be limited to the encoder, but any other device such as a resolver may be used.

In the above embodiment, the MR sensor is used as the output shaft sensor. In another embodiment, a magnetic sensor other than the MR sensor may be used. In the above embodiment, the output shaft sensor is a duplex system in which two independent output shaft signals are output. In another embodiment, the number of output shaft signals output from the output shaft sensor may be one, three, or greater than three. The output shaft sensor may be a simplex system or a multiplex system of a triplex systems or greater. The motor rotation angle sensor may be a multiplex system.

In the above embodiment, the number of engagement positions and the number of stages of the output shaft signal are matched with each other. In another embodiment, the number of engagement positions and the number of steps of the output shaft signal may be different. In another embodiment, the location where the value of the output shaft signal is switched may be any location between the valleys so long as it is configured such that the value at the time when the detent roller is engaged with the recess corresponding to each shift range is different.

In the above embodiment, the value of the output shaft signal is changed at the boundary position of the P-lock range. In another embodiment, the position where the value of the output shaft signal is changed may be inside the boundary position so long as being within the P-lock range. The position where the value of the output shaft signal is switched from V1 to V2 may be on the left side of the paper with respect to the position illustrated in FIG. 3. In the above embodiment, the value of the output shaft signal is changed at the boundary position of the N hydraulic pressure generation range. In another embodiment, the position where the value of the output shaft signal is changed may be inside the boundary position so long as being within the N hydraulic pressure generation range. The position where the value of the output shaft signal switches from V2 to V3 may be on the right side of the paper in the region Rn with respect to the position illustrated in FIG. 3. The position, where the value of the output shaft signal is switched from V3 to V4, may be on the left side of the paper in the region Rn with respect to the position illustrated in FIG. 3. Even with such a configuration, an effect similar to the above embodiment is exerted.

In the above embodiment, the rotating member is a detent plate, and the engaging member is a detent roller. In another embodiment, the rotating member and the engaging member are not limited to the detent plate and the detent roller, but the shapes and the like of those members may be any ones. In the above embodiment, the detent plate is provided with four valleys. In another embodiment, the number of valleys is not limited to four but may be any number. For example, the number of valleys of the detent plate may be two, and the P range and the not-P range may be switched. When the shift range switching mechanism switches between the P range and the not-P range, it is desirable to set the P range to the "first range" and the not-P range to the "second range." Further, the shift range switching mechanism, the parking lock mechanism, and the like may be different from those in the above embodiment.

In the above embodiment, the speed reducer is provided between the motor shaft and the output shaft. Although the details of the speed reducer is not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism other than the speed reducer may be provided. As mentioned above, the present disclosure is not limited to the above embodiments but may be implemented in various forms in the scope not deviating from its gist.

Although the present disclosure has been made in accordance with the embodiments, it is understood that the present disclosure is not limited to such embodiments and structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A shift range control device for controlling a shift range switching system switching a shift range of a vehicle by controlling drive of a motor, the shift range control device comprising:
    an angle calculation unit configured to acquire a motor rotation angle signal and calculate a motor angle output from a motor rotation angle sensor, the motor rotation angle sensor detecting a rotational position of the motor;
    a signal acquisition unit configured to acquire an output shaft signal output from an output shaft sensor, the output shaft signal having a value changing stepwise in accordance with a rotational position of an output shaft to which rotation of the motor is transmitted, the output shaft sensor detecting the rotational position of the output shaft;
    a drive control unit configured to control the drive of the motor such that the motor angle has become a target motor angle value corresponding to a target shift range; and
    a range determination unit configured to determine an actual range as an actual shift range based on the output shaft signal and the motor rotation angle signal,
    wherein the range determination unit is further configured to:
        determine the actual range based on the output shaft signal and the motor rotation angle signal during switching of the shift range; and
        determine the actual range based on the output shaft signal after the switching of the shift range is completed.

2. The shift range control device according to claim 1, wherein the output shaft signal includes a first signal value indicating a first range and a second signal value indicating a second value,
    wherein a region in which the first signal value is output is within a region to be determined as the first range,
    wherein a region in which the second value is output is greater than a region to be determined as the second range, and
    wherein, during the switching of the shift range, the range determination unit is configured to:
        execute determination as the first range based on the output shaft signal; and
        execute determination as the second range based on the output shaft signal and the motor rotation angle signal.

3. The shift range control device according to claim 2, wherein the output shaft rotates integrally with a rotation member having four valleys with which an engaging member is engaged in accordance with each range of a parking range, a reverse range, a neutral range, and a drive range,
    wherein the first range includes the parking range and the neutral range, and
    wherein the second range includes the reverse range and the drive range.

4. The shift range control device according to claim 1, wherein the output shaft signal includes a first signal value indicating a first range and a second signal value indicating a second value,
    wherein a region in which the first signal value is output is within a region to be determined as the first range,
    wherein a region in which the second value is output is greater than a region to be determined as the second range, and
    wherein, during the switching of the shift range, the microcomputer is further configured to:
        execute determination as the first range based on the output shaft signal; and
        execute determination as the second range based on the output shaft signal and the motor rotation angle signal.

5. A shift range control device for controlling a shift range switching system switching a shift range of a vehicle among a plurality of shift ranges by controlling drive of a motor, the shift range control device comprising:
    a microcomputer configured to:
        acquire a motor rotation angle signal and calculate a motor angle output from a motor rotation angle sensor, the motor rotation angle sensor detecting a rotational position of the motor;
        acquire an output shaft signal output from an output shaft sensor, the output shaft signal having a value changing stepwise in accordance with a rotational position of an output shaft to which rotation of the motor is transmitted, the output shaft sensor detecting the rotational position of the output shaft;

control the drive of the motor such that the motor angle has become a target motor angle value corresponding to a target shift range among the shift ranges;
determine an actual range as an actual shift range among the shift ranges;
determine the actual range among the shift ranges based on at least the output shaft signal during switching of the shift range; and
determine the actual range among the shift ranges based on the output shaft signal after the switching of the shift range is completed.

* * * * *